United States Patent [19]

Taylor

[11] Patent Number: 4,640,527

[45] Date of Patent: Feb. 3, 1987

[54] SAFETY VEHICLE

[76] Inventor: William D. Taylor, 1600 S. Orange Ave., Weslaco, Tex. 78596

[21] Appl. No.: 798,455

[22] Filed: Nov. 15, 1985

[51] Int. Cl.$^4$ .............................................. B60R 27/00
[52] U.S. Cl. .................................... 280/781; 280/756; 296/1 R
[58] Field of Search ............... 280/756, 762, 770, 752, 280/781; 296/102, 1 R

[56] References Cited

U.S. PATENT DOCUMENTS

| | | | |
|---|---|---|---|
| D. 182,011 | 1/1958 | Wilfert | D14/3 |
| 1,189,106 | 6/1916 | Henderson | 293/131 |
| 1,290,187 | 1/1919 | Helman | 293/131 |
| 1,420,065 | 6/1922 | Stillman | 272/135 |
| 1,629,890 | 5/1927 | Ronk | 280/781 |
| 2,002,823 | 5/1935 | Marvel et al. | 280/781 |
| 2,571,627 | 10/1951 | Solman et al. | 180/90 |
| 2,916,324 | 12/1959 | Graham | 296/189 |
| 3,560,041 | 2/1971 | Foster | 296/1 R |
| 4,135,591 | 1/1979 | Eberle | 280/756 |
| 4,453,763 | 6/1984 | Richards | 280/756 |

Primary Examiner—Richard A. Bertsch
Attorney, Agent, or Firm—G. Turner Moller

[57] ABSTRACT

A safety vehicle provides a hub and rim construction in which a central hub comprises part of a passenger shell. A rim surrounds the shell and is connected thereto by a multiplicity of spoke like members. The rim is larger and elongate relative to the hub to provide an engine compartment and trunk between the hub and the rim. Inverted scroll shaped dashboards face the front and rear seats to provide crash protection for the occupants.

9 Claims, 5 Drawing Figures

SAFETY VEHICLE

This invention relates to a vehicle having certain safety features including a novel frame construction affording substantially increased protection to passengers in the vehicle.

At the present time, automobiles are constructed with a separate frame or chassis to which is attached various metal panels comprising the exterior of the vehicle or the vehicle is of so-called "unit body" construction in which the body panels provide the mechanical strength of the automobile. Chassis type contruction dominated the domestic automobile market for many decades. In response to market demand for more energy efficient automobiles, unit body type automobiles have proliferated, particularly in lower priced, lighter weight, more fuel efficient vehicles.

It is now quite widely recognized that the unit body type vehicles are much less crash worthy than the older chassis type automobiles. In a crash, the older chassis type vehicles have an inherent advantage since they are, almost without exception, substantially heavier than the so-called unit body cars. It is, of course, a truism that the safest vehicle to be in during a collision is an M-60 tank since it is so massive. At the present time, it is also a truism that the automobile buying public demands automobiles which are energy efficient and which must accordingly be relatively light weight. The challenge to automotive engineers is to design a light weight automobile construction which affords increased crash protection to drivers and passengers.

Disclosures of some interest relative to this invention are found in U.S. Pat. Nos. D. 182,011; 1,189,106; 1,290,187; 1,420,065; 1,629,890; 2,002,823; 2,571,627; 2,916,324 and 3,560,041.

The vehicle of this invention is of hub and spoke design comprising an inner hub providing a closed rigid band and a passenger compartment shell rigid with the closed band. An outer rim or hub is larger than and surrounds the inner hub. A multiplicity of stress transmitting spoke members interconnect the outer rim and the inner hub. Means are provided for maintaining the spoke members in tension. A body shell covers the exterior of the vehicle.

On the inside of the passenger compartment shell, dashboards of inverted scroll shape are provided forwardly of the front and rear seats in order to minimize passenger injury in a collision due to impact with the inside of the vehicle.

It is an object of this invention to provide an improved vehicle construction providing enhanced crash protection to the occupants in the vehicle.

Other objects and advantages of this invention will become more fully apparent as this description proceeds, reference being made to the accompanying drawings and appended claims.

IN THE DRAWINGS

Figure 1:
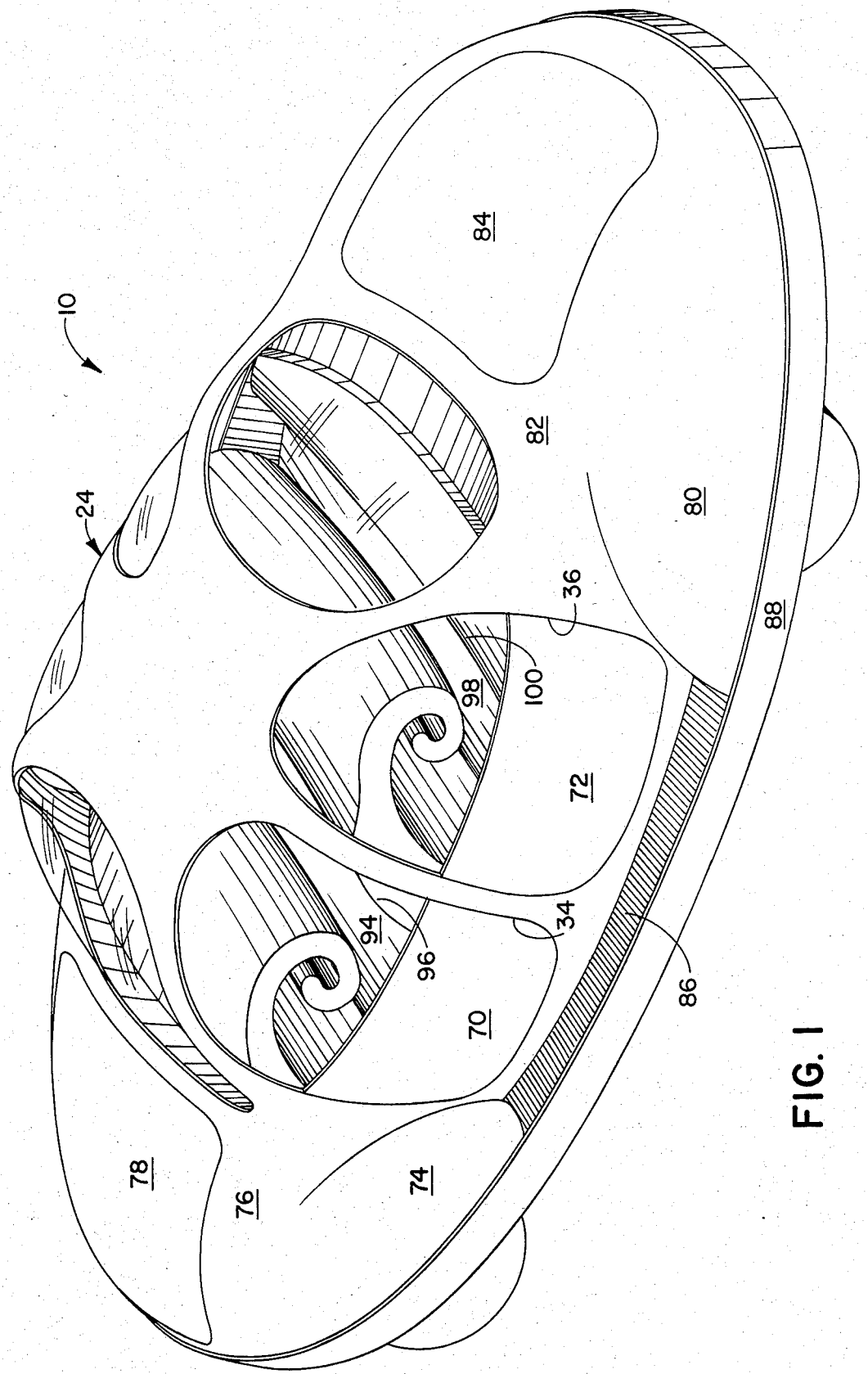
FIG. 1 is an isometric view of a vehicle constructed in accordance with the principles of this invention.
Figure 2:
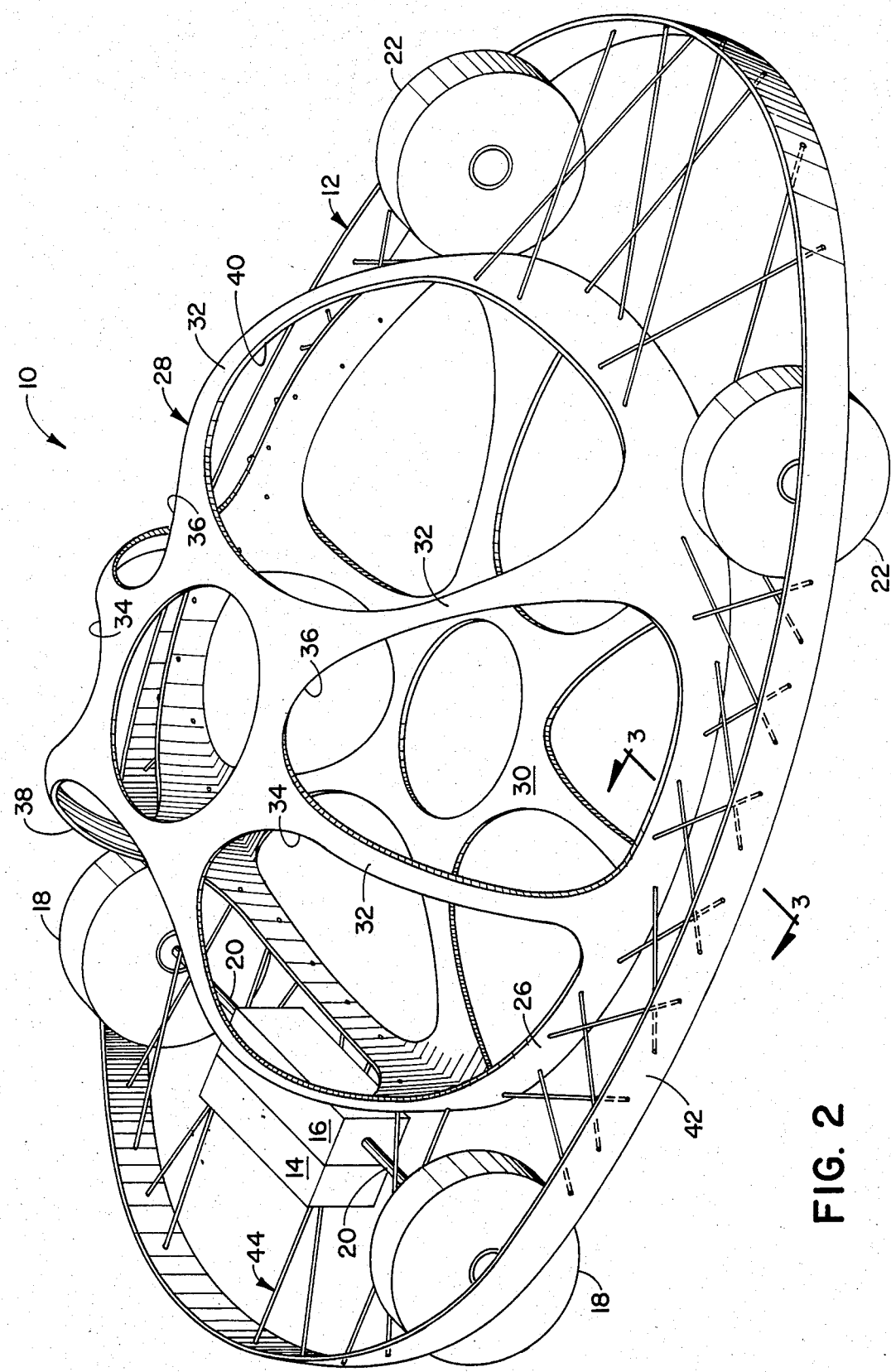
FIG. 2 is an isometric view, similar to FIG. 1, before the exterior body panels are attached to the vehicle.

Referring to FIGS. 1 and 2, there is illustrated a vehicle 10 of this invention comprising, as major components, a frame 12, an engine 14 driving a transmission 16 operatively connected to a pair of steerable drive wheels 18 by shafts 20, a pair of non-driven wheels 22, and a body shell 24 on the exterior of the frame 12.

The frame 12 comprises an inner hub 26 comprising a closed rigid band. A passenger compartment shell 28 is rigid with the band 26 and comprises a floor 30 of the passenger compartment and a series of upwardly converging struts 32 merging into a roof structure and providing a first pair of openings 34 for the front doors of the vehicle 10, a pair of rear openings 36 for the rear doors of the vehicle 10, an opening 38 for the front windshield, and a rear window opening 40.

The frame 12 also includes an outer hub or rim 42 comprising a closed band larger than and surrounding the inner hub 26. As will be evident from FIG. 2, the inner hub 26 is more nearly circular while the outer hub 42 is more nearly oval or elliptical. Thus, the outer hub 42 is more elongate than the inner hub 26.

Figure 3:
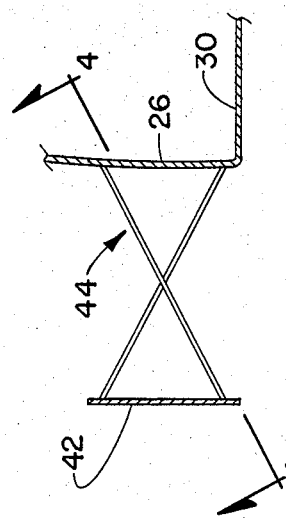
FIG. 3 is a cross-sectional view of the vehicle of FIG. 2 taken substantially along line 3—3 thereof as viewed in the direction indicated by the arrows.
Figure 4:
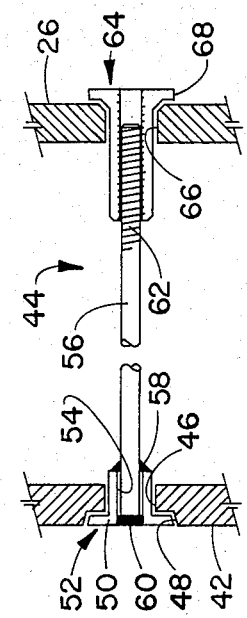
FIG. 4 is an enlarged cross-sectional view of FIG. 3 taken substantially along line 4—4 thereof as viewed in the direction indicated by the arrows.

Interconnecting the outer hub 42 and the inner hub 26 are a multiplicity of spoke members 44 shown best in FIGS. 3 and 4. A multiplicity of passages 46 are provided in the outer rim 42 where the spokes 44 are to connect. The passages 46 enlarge adjacent the exterior of the outer hub 42 to provide a shoulder 48 receiving a lip 50 of a bolt head 52. The bolt head 52 may be of any suitable type and is illustrated as comprising a central passage 54 receiving one end of an elongate shank 56 comprising the spokes. The shank 56 is attached to the bolt head 52 in any suitable manner, as by the provision of weldments 58, 60.

The opposite end of the shank 56 provides external threads 62 received in an elongate interiorly threaded nut 64 extending through a passage 66 in the inner hub 26. The nut 64 may provide an exterior surface 68 for receiving a power wrench. The nut 64 is threadably advanced relative to the threads 26 sufficient to tension the spoke 56 a desired amount. It will be evident that tensioning all of the spoke members 44 connecting the inner and and outer hubs 26, 42 creates a lightweight structure of considerable strength and resilience as may be visualized by considering the strength and resilience of a bicycle wheel.

In order to complete the vehicle 10, exterior body panels are added to the partially assembled vehicle of FIG. 2 as suggested in FIG. 1. Specifically, front and rear doors 70, 72 may be placed in the door openings 34, 36. Front fenders 74 hood panels 76 and a hood 78 are used to cover the front of the vehicle between the outer hub 42 and the passenger shell 28. Similarly, rear fenders 80, a rear deck assembly 82 and a trunk lid 84 are used to cover the rear of the vehicle. A running board panel 86 covers between the outer hub 42 and the inner hub 26. A decorative facing 88 may be provided on the exterior of the outer hub 42.

As shown best in FIG. 3, at least some of the spokes 44 reside in vertical planes relative to others of the spokes in order to provide for stability of the inner hub 26 both vertically and horizonally relative to the outer hub 42. It will be seen that the spokes 44 comprise the only load supporting connection between the inner hub 26 and the outer rim 42. Thus, the vehicle 10 has a construction analagous to a bicycle wheel although the inner hub 26 is much larger relative to the outer rim 42 than in the case of a bicycle wheel. The inner hub 26, floor 30 and struts 32 provide a protective shell for passengers of the vehicle 10.

Figure 5:
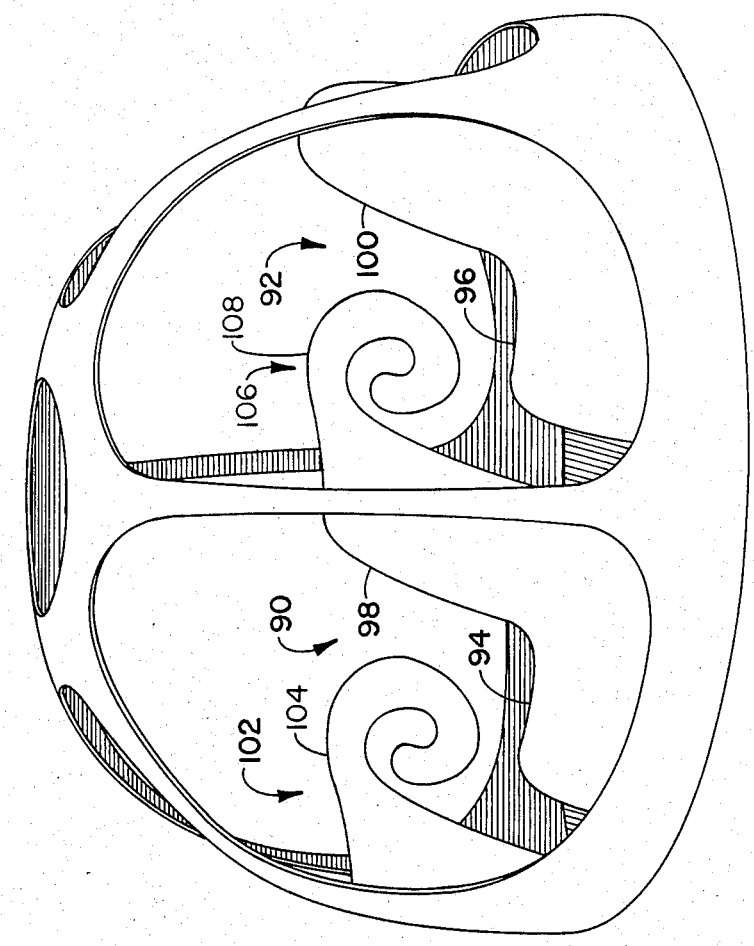
FIG. 5 is a partial side view of the inner hub of this invention.

Inside the vehicle 10 are front and rear seats 90, 92 having seat panels 94, 96 and brackrest panels 98, 100 respectively as shown best in FIGS. 1 and 5. The front dashboard 102 provides a surface 104 of inverted scroll shape facing the backrest panel 98. It will be seen that the surface 104 is smoothly arcuate on a fairly large diameter so that the driver or passenger thrown thereagainst in a collision will not be injured by the collision with the dashboard 102.

In a similar manner, a dashboard arrangement 106 is connected to the back of the front seat. The rear dashboard 106 provides a surface 108 of inverted scroll shape juxtaposed to the rear backrest panel 100. Thus, the rear dashboard 106 provides a surface against which rear passengers collide during a collision. Because the inverted scroll shape of the front and rear dashboards 102, 106 have large curved surfaces, there is little likelihood of passenger injury caused by the secondary collision of a passenger with the vehicle.

Although the invention has been described in its preferred forms with a certain degree of particularity, it is understood that the present disclosure is only by way of example and that numerous changes in the details of construction and in the combination and arrangement of parts may be resorted to without departing from the spirit and scope of the invention as hereinafter claimed.

I claim:

1. A motorized vehicle comprising
 a frame; and
 an engine, drive train and a plurality of wheels carried on the frame for propelling the vehicle;
 the frame comprising
   an inner rigid hub including a closed band;
   a passenger compartment shell rigid with and carried by the inner hub;
   an outer rim larger than and surrounding the inner hub; and
   a multiplicity of stress transmitting members interconnecting the outer rim and inner hub, the members comprising elongate bodily rigid spokes and means maintaining the spokes in tension, the spokes comprising the only load supporting connection between the rim and the hub; and
 dy shell on the exterior of the frame including a roof, a hood and a trunk lid.

2. The motorized vehicle of claim 1 wherein the stress transmitting members include tension adjusting connections with the hub and rim.

3. The motorized vehicle of claim 2 wherein the tension adjusting connections comprise a threaded section on the spokes and a threaded connection carried by the hub.

4. A motorized vehicle comprising
 a frame; and
 an engine, drive train and a plurality of wheels carried on the frame for propelling the vehicle;
 the frame comprising
   an inner rigid hub including a closed band;
   a passenger compartment shell rigid with and carried by the inner hub;
   an outer rim larger than and surrounding the inner hub; and
   a multiplicity of stress transmitting members interconnecting the outer rim and inner hub, the members comprising elongate bodily rigid spokes and means maintaining the spokes in tension including tension adjusting connections with the hub and rim, the spokes comprising the only load supporting connection between the rim and the hub, the spokes being inclined to a horizontal plane extending through the outer hub; and
 a body shell on the exterior of the frame including a roof, a hood and a trunk lid.

5. A motorized vehicle comprising
 a frame; and
 an engine, drive train and a plurality of wheels carried on the frame for propelling the vehicle;
 the frame comprising
   an inner rigid hub including a closed band;
   a passenger compartment shell rigid with and carried by the inner hub;
   an outer rim larger than and surrounding the inner hub, the outer rim comprising a closed band, the closed band of the outer rim being more elongate than the closed band of the inner hub; and
   a multiplicity of stress transmitting members interconnecting the outer rim and inner hub, the members comprising elongate bodily rigid spokes and means maintaining the spokes in tension, the spokes comprising the only load supporting connection between the rim and the hub; and
 a body shell on the exterior of the frame including a roof, a hood and a trunk lid.

6. The motorized vehicle of claim 5 wherein the passenger compartment shell comprises a floor spanning and rigid with the inner hub and a plurality of upwardly converging struts merging into a roof structure.

7. A motorized vehicle comprising
 a frame; and
 an engine, drive train and a plurality of wheels carried on the frame for propelling the vehicle;
 the frame comprising
   an inner rigid hub including a closed band;
   a passenger compartment shell rigid with and carried by the inner hub;
   an outer rim larger than and surrounding the inner hub; and
   a multiplicity of stress transmitting members interconnecting the outer rim and inner hub, the members comprising elongate bodily rigid spokes and means maintaining the spokes in tension, the spokes comprising the only load supporting connection between the rim and the hub;
 a body shell on the exterior of the frame including a roof, a hood and a trunk lid; and
 a front seat in the passenger shell providing a seat panel and a backrest panel and a dashboard in front of the front seat, the dashboard having a surface defining an inverted scroll juxtaposed to the backrest panel.

8. The motorized vehicle of claim 7 further comprising a back seat in the passenger shell providing a seat panel and a backrest panel and a rear dashboard connected to the back of the front seat, the rear dashboard having a surface defining an inverted scroll juxtaposed to the rear seat backrest panel.

9. A motorized vehicle comprising
a frame; and
an engine, drive train and a plurality of wheels carried on the frame for propelling the vehicle;
the frame comprising
　an inner rigid hub including a closed band;
　a passenger compartment shell rigid with and carried by the inner hub;
　an outer rim larger than and surrounding the inner hub, the outer rim being elongate relative to the inner hub providing an engine compartment between the rim and the hub on the forward end of the vehicle and a trunk between the rim and the hub on the rear end of the vehicle; and
　a multiplicity of stress transmitting members interconnecting the outer rim and inner hub, the members comprising elongate bodily rigid spokes and means maintaining the spokes in tension, the spokes comprising the only load supporting connection between the rim and the hub; and
a body shell on the exterior of the frame including a roof, a hood and a trunk lid.

* * * * *

UNITED STATES PATENT OFFICE
CERTIFICATE OF CORRECTION

PATENT NO. : 4,640,527
DATED : February 3, 1987
INVENTOR(S) : William D. Taylor

It is certified that error appears in the above-identified patent and that said Letters Patent are hereby corrected as shown below:

Claim 1 - penultimate line - "dy" should be --a body--.

Signed and Sealed this

Twenty-eighth Day of April, 1987

Attest:

DONALD J. QUIGG

Attesting Officer       Commissioner of Patents and Trademarks